(12) United States Patent
Chen et al.

(10) Patent No.: US 12,499,369 B2
(45) Date of Patent: Dec. 16, 2025

(54) EFFICIENT IDENTIFICATION OF CRITICAL FAULTS IN NEUROMORPHIC HARDWARE OF A NEURAL NETWORK

(71) Applicant: Nvidia Corporation, Santa Clara, CA (US)

(72) Inventors: Ching-Yuan Chen, Chapel Hill, NC (US); Krishnendu Chakrabarty, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1149 days.

(21) Appl. No.: 17/411,672

(22) Filed: Aug. 25, 2021

(65) Prior Publication Data

US 2022/0067531 A1 Mar. 3, 2022

Related U.S. Application Data

(60) Provisional application No. 63/070,419, filed on Aug. 26, 2020.

(51) Int. Cl.
*G06N 3/084* (2023.01)
*G06F 11/14* (2006.01)

(52) U.S. Cl.
CPC .......... *G06N 3/084* (2013.01); *G06F 11/1476* (2013.01)

(58) Field of Classification Search
CPC ........ G06N 3/084; G06N 3/065; G06N 20/00; G06F 11/1476
USPC .......................................................... 714/25
See application file for complete search history.

(56) References Cited

U.S. PATENT DOCUMENTS

2021/0012974 A1* 1/2021 Zhou ..................... H01G 9/028
2021/0318922 A1* 10/2021 Roberts ............... G06F 11/0793

OTHER PUBLICATIONS

Madry, et al.; "Towards Deep Learning Models Resistant to Adversarial Attacks"; Int. Conf. Learning Representations; 2018; 23 pgs.
Gao, et al.; "STRIP: A Defence Against Trojan Attacks on Deep Neural Networks"; Proc. Computer Security Applications Conf.; 2019; 13 pgs.
Hu, et al.; "Dot-Product Engine for Neuromorphic Computing: Programming 1T1M Crossbar to Accelerate Matrix-Vector Multiplication"; DAC '16, Austin, TX; Jun. 2016; 6 pgs.

(Continued)

*Primary Examiner* — Yair Leibovich

(57) ABSTRACT

The disclosure provides misclassification-driven training (MDT) that efficiently identifies critical faults in neuromorphic hardware, such as a memristor crossbar. MDT advantageously identifies whether a hardware fault is a critical fault and can be used to limit fault recovery when a hardware fault is not a critical fault. By applying fault-tolerant techniques directed to critical faults, such as only for critical faults, processing overhead of a neural network can be reduced. In one aspect, the disclosure provides a method of identifying critical faults in neuromorphic hardware of a neural network. In one example the method of identifying includes: (1) determining a significant parameter of a trained neural network that impacts classification of a sample of a dataset, (2) obtaining a location of the significant parameter in the neuromorphic hardware, and (3) identifying the location as a critical fault of the neuromorphic hardware.

29 Claims, 7 Drawing Sheets

(56) References Cited

OTHER PUBLICATIONS

Chaudhuri, et al.; "Analysis of Process Variations, Defects, and Design-Induced Coupling in Memristors"; International Test Conference; 2018; 10 pgs.

Sun, et al.; "Impact of Non-Ideal Characteristics of Resistive Synaptic Devices on Implementing Convolutional Neural Networks"; IEEE Journal of Emerging and Selected Topics in Circuits and Systems; Sep. 2019; 10 pgs.

Liu, et al.; "Design of Fault-Tolerant Neuromorphic Computing Systems"; 23rd IEEE European Test Symposium; 2018; 9 pgs.

Gebregiorgis, et al.; "Testing of Neuromorphic Circuits: Structural vs Functional"; International Test Conference; 2019; 10 pgs.

Li, et al.; "Understanding Error Propagation in Deep Learning Neural Network (DNN) Accelerators and Applications"; Proc. Int. Conf. High Performance Computing, Networking, Storage and Analysis; 2017; 12 pgs.

Fieback, et al.; "Device-Aware Test: A New Test Approach Towards DPPB Level"; International Test Conference; 2019; 10 pgs.

Kannan, et al.; "Sneak-Path Testing of Crossbar-Based Nonvolatile Random Access Memories"; IEEE Transactions on Nanotechnology; May 2013; 14 pgs.

Xu, et al.; "Safety Design of a Convolutional Neural Network Accelerator with Error Localization and Correction"; International Test Conference; 2019; 10 pgs.

Li, et al.; "ICE: Inline Calibration for Memristor Crossbar-based Computing Engine"; Date; 2014; 4 pgs.

Liu, et al.; "Rescuing Memristor-based Neuromorphic Design with High Defects"; DAC '17, Austin, TX; 2017; 6 pgs.

Xia, et al.; "Stuck-at Fault Tolerance in RRAM Computing Systems"; IEEE Journal on Emerging and Selected Topics in Circuits and Systems; Mar. 2018; 14 pgs.

Krizhevsky, et al.; "ImageNet Classification with Deep Convolutional Neural Networks"; Proc. Int. Conf. Neural Information Processing Systems; 2012; 9 pgs.

Simonyan, et al.; "Very Deep Convolutional Networks for Large-Scale Image Recognition"; Conference paper at ICLR; 2015; 14 pgs.

Szegedy, et al.; "Going deeper with convolutions"; IEEE Conf. Computer Vision and Pattern Recognition; 2015; 12 pgs.

He, et al.; "Deep Residual Learning for Image Recognition"; CVPR; 2016; 12 pgs.

Xia, et al.; "Fault-Tolerant Training with On-Line Fault Detection for RRAM-Based Neural Computing Systems"; DAC 17, Austin, TX; Jun. 2017; 6 pgs.

Krizhevsky, et al.; "The CIFAR-10 dataset"; http://www.cs.toronto.edu/~kriz/cifar.html; 2009; 4 pgs.

Deng, et al.; "ImageNet: A Large-Scale Hierarchical Image Database"; CVPR; 2009; 8 pgs.

Hamdioui, et al.; "Testing Open Defects in Memristor-Based Memories"; IEEE Transactions on Computers; Jan. 2015; 13 pgs.

Kannan, et al.; "Sneak path Testing and Fault Modeling for Multilevel Memristor-based Memories"; IEEE Int. Conf. Computer Design; 2013; 6 pgs.

Chen, et al.; "RRAM Defect Modeling and Failure Analysis Based on March Test and a Novel Squeeze-Search Scheme"; IEEE Transactions on Computers; Jan. 2015; 11 pgs.

Chen, et al.; "Fault Modeling and Testing of 1T1R Memristor Memories"; IEEE 33rd VLSI Test Symposium; 2015; 6 pgs.

Goodfellow, et al.; "Deep Learning"; Chapters 6, 7, and 12; MIT Press; http://www.deeplearningbook.org; 2016; 150 pgs.

\* cited by examiner

EFFICIENT IDENTIFICATION OF CRITICAL FAULTS IN NEUROMORPHIC HARDWARE OF A NEURAL NETWORK

CROSS-REFERENCE TO RELATED APPLICATION

This application claims the benefit of U.S. Provisional Application Ser. No. 63/070,419, filed by Ching-Yuan Chen, et al., on Aug. 26, 2020, entitled "Efficient Identification of Critical Faults in a Memristor Crossbar-Based Deep Neural Network," commonly assigned with this application and incorporated herein by reference in its entirety.

TECHNICAL FIELD

This application is directed, in general, to faults in neural networks and, more specifically, to identifying critical faults in neural networks.

BACKGROUND

Deep Learning (DL) applications are becoming increasingly ubiquitous. However, recent research has highlighted a number of reliability concerns associated with deep neural networks (DNNs) used for DL. In particular, hardware-level reliability of DNNs is of particular concern when DL models are mapped to specialized neuromorphic hardware such as memristor-based crossbars. However, DNN architectures are inherently fault-tolerant and many faults do not have any significant impact on inferencing accuracy.

SUMMARY

In one aspect, a method of identifying critical faults in neuromorphic hardware of a neural network is disclosed. In one example the method of identifying includes: (1) determining a significant parameter of a trained neural network that impacts classification of a sample of a dataset, (2) obtaining a location of the significant parameter in the neuromorphic hardware, and (3) identifying the location as a critical fault of the neuromorphic hardware.

In another aspect, the disclosure provides a method of training a machine learning (ML) model for classifying critical faults. In one example the method of training includes: (1) identifying critical faults from a dataset using misclassification-driven training (MDT), (2) identifying benign faults from the dataset using random fault injections and forward inferencing, (3) creating a training dataset that includes the critical faults and the benign faults, and training the ML model using the training dataset.

In yet another aspect, a method of identifying faults in a NN is disclosed. In one example, the method of identifying faults in a NN includes: (1) classifying a dataset using a NN, (2) determining if detection of faults is needed, wherein the faults are hardware faults of the NN, (3) performing detection of the faults when needed, and (4) performing fault recovery of the hardware faults when a detected fault is a critical fault.

In still yet another aspect, a method of manufacturing a chip including a neural network (NN) having a memristor crossbar is disclosed. In one example the method of manufacturing includes: (1) identifying one or more memristor cells of a crossbar as critical, (2) allocating fault-tolerant hardware for the one or more memristor cells that are critical, and (3) fabricating the chip with the fault-tolerant hardware.

BRIEF DESCRIPTION

Reference is now made to the following descriptions taken in conjunction with the accompanying drawings, in which.

DETAILED DESCRIPTION

Figure 1:
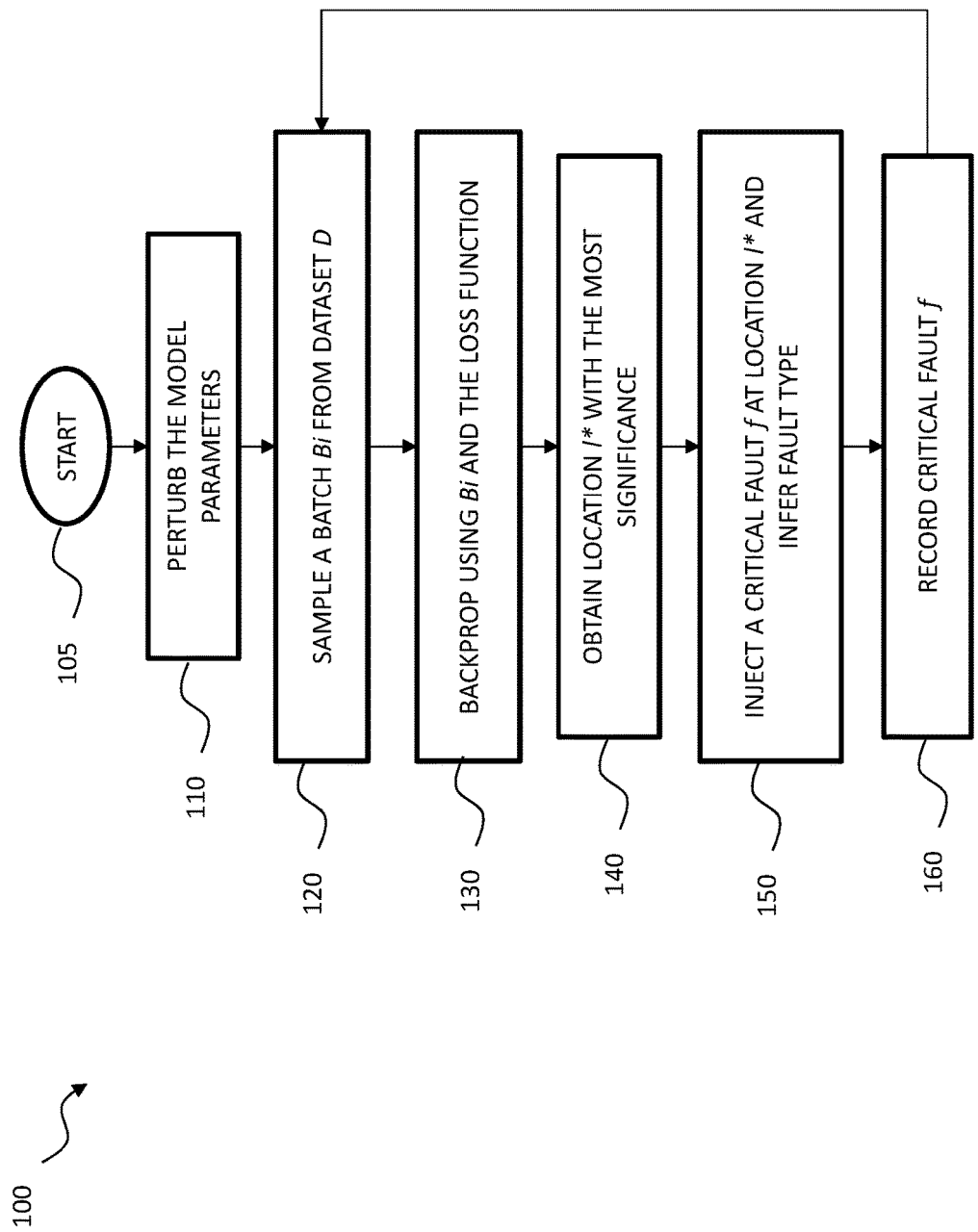
FIG. 1 illustrates a flow diagram of an example of a method of identifying critical faults in neuromorphic hardware of a neural network carried out according to the principles of the disclosure.

Deep Learning (DL) applications, e.g., self-driving cars, image recognition, and medical diagnosis, are becoming an increasingly important part of life. However, recent research has highlighted a number of reliability concerns associated with DL architectures. Some of the reliability concerns include the vulnerability of DL models to perturbations of the input dataset of an application and adversarial attacks. For example, when a small amount of noise or backdoor triggers are added to input data, the victim models provide significantly low prediction accuracy. Defenses against such malicious attacks at an abstract functional level have been proposed.

On the other hand, hardware-level reliability for DL architectures have received less attention. A promising implementation pathway for DL models is to map them to specialized neuromorphic hardware, e.g., memristor-based crossbars. Such a mapping provides in-memory computing capability, high energy efficiency, and a means to overcome the memory wall arising from the von Neumann bottleneck. However, neuromorphic hardware can have defects due to the immature fabrication process and high density. For example, memristor devices can be subject to various types of manufacturing defects and process variations. In addition, both training and inferencing associated with a memristor crossbar can be significantly degraded by defects, variations, and non-idealities. These defects, variations, and non-idealities can be viewed as faults, which is defined as any deviation from the nominal expected behavior of a neuromorphic hardware cell, such as memristor cells in a memristor crossbar. These faults can adversely affect the classification accuracy when such crossbars are used for inferencing.

Not all faults in neuromorphic hardware, however, are functionally critical. While some faults can be categorized as being a critical, i.e., they affect the prediction results and lead to misclassification, other faults are benign. For example, critical faults can be less than 0.1% of the faults of a large DNN that is mapped to a memristor crossbar. The identification of critical faults is therefore akin to finding the proverbial needle in a haystack.

Since most faults can be benign, making all or most of the neuromorphic hardware robust to faults can be an overkill. For example, spare crossbar columns and rerouting circuits can be incorporated in memristor crossbars to enable remapping, but this solution can be either prohibitively expensive or ineffective without an understanding of the locations of the small number of critical faults in the crossbar. Additionally, indiscriminate on-chip retraining initiated by error detection can induce unnecessary reading and programming cycles, and lead to wear-out of the neuromorphic hardware, such as the memristor cells. Thus, careful analysis to identify faults that are critical for a given application can be advantageous.

The disclosure provides misclassification-driven training (MDT) that efficiently identifies critical faults in neuromorphic hardware, such as a memristor crossbar. The MDT advantageously identifies whether a hardware fault is a critical fault and can be used to limit fault recovery when a hardware fault is not a critical fault. As noted above, critical faults such as manufacturing faults are typically a small portion of all possible faults of neuromorphic hardware. By applying fault-tolerant techniques directed to critical faults, such as only for critical faults, processing overhead of a NN can be reduced. A critical fault as used herein is defined as a hardware fault that causes misclassification of at least a portion of an input dataset, wherein the misclassification is based on an accuracy threshold set by a user/application. If the classification accuracy in the presence of the fault falls below this threshold, the fault is deemed to be critical.

The disclosure also provides using the criticality information obtained by the MDT for training a machine learning (ML) model to predict if an arbitrary neuromorphic hardware fault, such as a crossbar fault, is a critical fault or not. An ML model can be trained to predict fault criticality without explicitly running fault simulation or MDT. The resulting trained ML model, referred to as a critical fault classifier, is essentially a binary classifier to predict whether a fault is critical. The training dataset for training the critical fault classifier can be balanced by employing MDT to identify critical faults and random sampling to identify benign faults. For example, after a sufficient number of critical faults are identified using MDT and a corresponding number of benign faults are identified using random sampling followed by forward inferencing, a balanced training dataset can be constructed for the critical fault classifier.

A fault-tolerant framework is also provided using a critical fault classifier that is trained for classifying critical faults. The fault-tolerant framework can be used to only target critical faults to reduce the hardware and performance overhead of recovering the accuracy of a NN, such as a memristor crossbar-based DNN, from the crossbar faults.

Results from the critical fault classifier are transferable and can be used among different applications, like image classification tasks using a different dataset. The transferability is advantageous since the whole critical fault classifying flow does not have to be rerun for a new application. Results from the critical fault classifier can also be used for fabricating neural networks as disclosed herein.

A MDT algorithm is disclosed for identifying critical faults in neuromorphic hardware of a neural network. A memristor crossbar and a DNN are used as non-limiting examples of neuromorphic hardware and a NN in the below discussion of the MDT algorithm and in other examples disclosed herein. Faults in the crossbar result in the deviation of the DNN model parameters from their original values. The deviation in the model parameters is represented by the matrix $\Delta$. The model parameter matrix for a DNN with crossbars faults is therefore $\Theta+\Delta$, wherein $\Theta$ represents the DNN parameters (i.e., a matrix of weights of the DNN).

The model parameters $\Theta$ can have negative values but the memristor conductance vector G can only include positive values. To address this problem, a linear mapping M as represented by Equation 1 below can be used, wherein $\alpha$ and $\beta$ are constants corresponding the particular memristor crossbar.

$$\mathcal{M}: G = \alpha \cdot \Theta + \beta \quad (1)$$

Identification of critical faults is formulated as an optimization problem, which is addressed using the MDT algorithm, which is represented by Equation 2. The notation used for the discussion of the MDT algorithm and other examples is provided in Table 1 below.

TABLE 1

Notation used in description of MDT

| Symbol | Explanation |
| --- | --- |
| F | DNN architecture |
| $\Theta$ | DNN parameter matrix |
| $\mathcal{D}$ | data set |
| x | input data |
| y | output label |
| $\mathcal{M}(\cdot)$ | mapping function |
| $S(\cdot)$ | significance function |
| $\mathcal{L}$ | loss function |
| $\Delta$ | deviation matrix |
| $\|\cdot\|_0$ | 0-norm function |
| $\|\cdot\|$ | number of matrix (vector) elements |
| $B_i$ | i-th data batch |
| $\nabla$ | gradient |
| l | parameter/fault location |

Given a DNN architecture F, its parameters $\Theta$, dataset (x; y) $\in$ D, where x stands for input dataset and y denotes the output label, the objective is to determine the significance for each parameter (fault location) and target deviations in the most significant parameters that can cause misprediction. This problem can be mapped into the following optimization problem in terms of the parameter deviation $\Delta$ as represented by Equation 2 below:

$$\max_{\Delta} \sum_{(x,y)\in \mathcal{D}} \mathcal{L}(F_{\Theta+\Delta}(x), y) \text{ such that } \|\Delta\|_0 < c \quad (2)$$

where $\mathcal{L}$ is the loss function used to evaluate the deviation between the model output and the correct label y. A cross-entropy loss for $\mathcal{L}$ can be used without loss of generality. A conventional, well-known cross-entropy loss can be used. The obtained matrix $\Delta$ is mapped to faults in the underlying memristor based crossbar. The constraint $\|\Delta\|_0 < c$ is imposed to ensure that the optimization problem will converge. In the MDT algorithm, the 0-norm of the resulting deviation $\|\Delta\|_0$ is not confined, where the 0-norm is defined in Equation 3 as:

$$\|\Delta\|_0 = |\Delta[0]|^0 + |\Delta[1]|^0 + |\Delta[2]|^0 \ldots + |\Delta[l]|^0 + \ldots, \quad (3)$$

where $\Delta[l]$ is the element of $\Delta$ at the location l and $|\Delta[l]|^0$ indicates whether the element is non-zero.

Based on Equation 3, the $\|\Delta\|_0$ returns the count of the non-zero elements in $\Delta$. This implies that $\Delta$ is mapped to $\|\Delta\|_0$ critical faults in the underlying hardware. Thus, a small value of $\|\Delta\|_0$ means that critical faults are expected to be a small subset of all possible faults, but these faults lead to misprediction by the system. The above optimization problem represented by Equation 2 can be solved using a gradient-based algorithm as described below with respect to Equation 4. Backpropagation can be used wherein in each gradient step, the parameter that has the most significant impact on the predicting results is greedily selected. The injected deviations are mapped to physical memristor faults.

Critical faults are obtained by mapping each non-zero element in $\Delta$ to a physical memristor fault. Since the goal is to evaluate the criticality of individual crossbar faults, a verification step can be carried out by performing forward inferencing to verify that each such memristor fault is catastrophic (i.e., critical). The injected fault type can be determined by the corresponding scale and the direction (sign) of the A element. Stuck-on/off and open/short faults are used herein as non-limiting examples of faults. Other faults models, such as for slow-write faults, read/write disturbance, and coupling faults, can also be used. In the disclosed examples, single faults are considered but the disclosed framework is general and can also be used to evaluate multiple faults simultaneously, which includes substantially simultaneously.

FIG. 1 illustrates a flow diagram of an example of a method 100 of identifying critical faults in neuromorphic hardware of a neural network carried out according to the principles of the disclosure. The method 100 is a MDT method that employs the MDT algorithm. FIG. 1 presents the overall flow for a single iterative run of the method 100. The method 100 begins in step 105 with a pre-trained model F (fault model $F_{\Theta+\Delta}$), model parameters $\Theta$, dataset D, loss function $\mathcal{L}$, and parameter mapping $\mathcal{M}$.

In step 110, the model parameters $\Theta$ are perturbed. Perturbing the model parameters $\Theta$ prevents or at least reduces the optimization algorithm of Equation 2 from getting stuck at a local minima. Step 110 also ensures that each run of the method 100 will yield a different critical fault. The perturbation provided in step 110 should not affect the model predicting accuracy. For example, zero-centered Gaussian noise can be added to each parameter with the standard deviation $\sigma = 0.025 \times (\Theta_{max} - \Theta_{min})$.

In step 120, an i-th batch $B_i$ is sampled from the dataset D and used to identify critical faults. Critical faults are iteratively injected into each location of the pre-trained model F until all data points in Bi are mispredicted by the fault model $F_{\Theta+\Delta}$. The number of batches that are sampled and the size of the sampling can be based on the dataset D and the model. A user can specify and adjust the number and size of the batches. Larger batches are typically appropriate for larger input data sizes but can lead to a higher likelihood of some benign faults being flagged as critical. A verification step can be carried out to address this situation.

A gradient is derived to determine the parameter with the most significance in step 130. A gradient is derived for each iteration for the sampled batch $B_i$ and can be calculated using backward propagation. The derived gradient corresponding to the current deviation $\Delta$ can be denoted as $\nabla_\Delta$. Equation 4 can be used for determining the gradient.

In step 140, the significance function $S(\bullet)$ is calculated for each parameter (or fault location) based on $\nabla_\Delta$. The significance of a parameter is defined, for example, as the absolute value of the gradient, such as represented by Equation 4 below:

$$S(\nabla_\Delta) = \left| \sum_{(x,y) \in B_i} \nabla \mathcal{L}(F_{\Theta+\Delta}(x), y) \right| \tag{4}$$

where $|\bullet|$ is the element-wise absolute function. The location with the most significance, denoted by 1*, is selected to inject a fault in step 150.

The fault-induced deviation $\Delta$ is updated at 1* according to the direction (sign) of the gradient. This gradient-ascent step is aimed at maximizing the loss function $\mathcal{L}(\bullet)$. "Ascent" is used to indicate that the change in direction of the deviation $\Delta$ is the same as the gradient at 1*, or $\nabla_{\Delta[l^*]}$.

The newly identified critical fault is recorded in step 160. A critical fault can be specified by its location 1*, fault type f, and the deviation value $\mathcal{M} \Delta[l^*])$.

Figure 2:
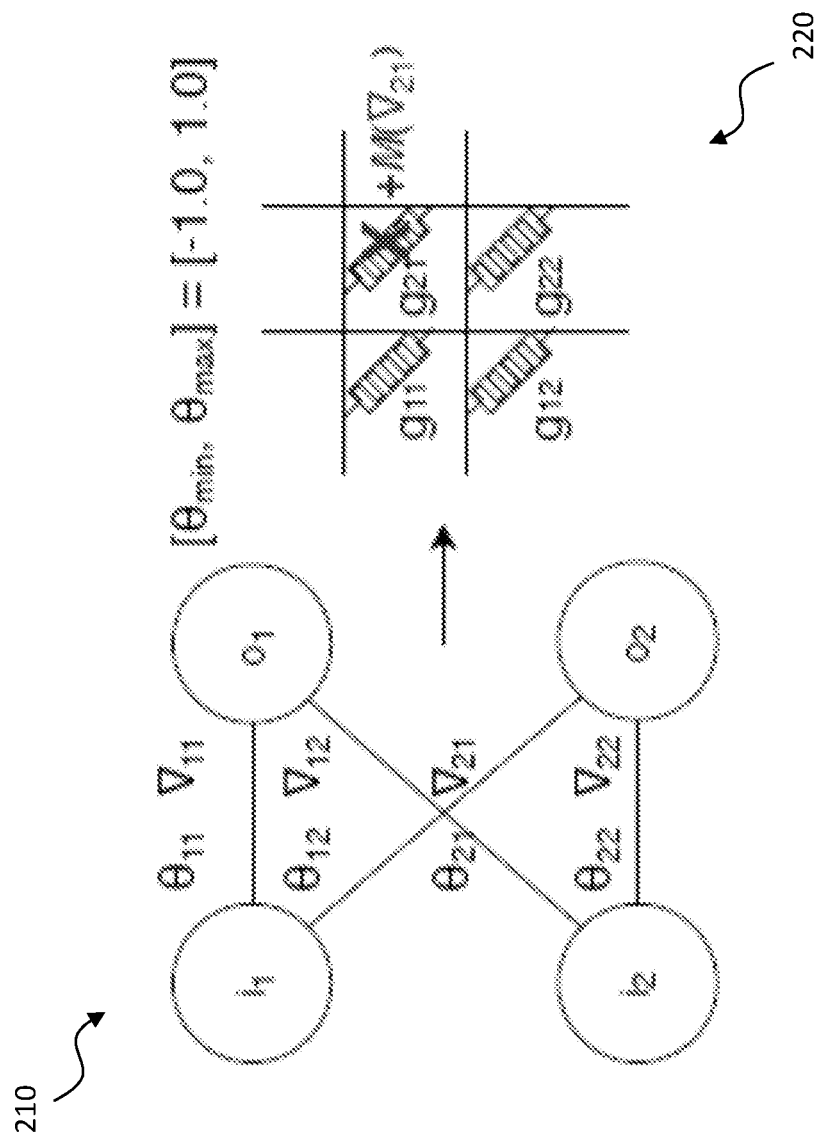
FIG. 2 illustrates a 2×2 fully connected layer of a neural network (NN) as an example of using at least a portion of the method of FIG. 1.

Turning now to FIG. 2, a working example of the MDT algorithm is illustrated. FIG. 2 illustrates a 2×2 fully connected layer of a DNN 210 with two input neurons ($i_1$ and $i_2$), two output neurons ($o_1$ and $o_2$), and four parameters $\Theta_{11}$, $\Theta_{12}$, $\Theta_{21}$, and $\Theta_{22}$. Each of the parameters is mapped to a memristor of a memristor crossbar 220. As an example, $[\Theta_{11}, \Theta_{12}, \Theta_{21}, \Theta_{22}] = [0.15, 0.20, -0.35, -0.25]$. The gradient for each parameter is obtained using backpropagation such that $[\nabla_{11}, \nabla_{12}, \nabla_{21}, \nabla_{22}] = [0.10, 0.20, -2.00, -0.10]$. $\Theta_{21}$ is identified as the most significant parameter using $S(\bullet)$ in Equation 4 from step 140 of the method 100. The deviation $\nabla_{21}$ is then introduced in the same direction as the obtained gradient and A becomes $[0, 0, \nabla_{21}, 0] = [0, 0, -2:00, 0]$. If the deviated parameter value is still in the nominal range $[\Theta_{min}; \Theta_{max}] = [-1.0, 1.0]$, the identified critical fault is a stuck-off fault; otherwise, it's a stuck-open fault. Since the deviated parameter $\Theta_{21} + \nabla_{21} = -2.35$ is out of the nominal range, the mapping from $\Delta$ is to a stuck-open fault. The deviated memristor conductance is then obtained using the mapping $\mathcal{M}$, i.e., the linear mapping noted above. In the right-hand side of FIG. 2 the corresponding conductance $g_{21}$ in the crossbar (marked with a cross) is deviated by a magnitude of $\mathcal{M}(\nabla_{21}) = \mathcal{M}(-2.00)$ because of the stuck-open fault.

In some use cases, misprediction of one class can be more catastrophic than others. For example, in the case of a classifier deployed on an autopilot vehicle, misclassifying a car (e.g., class label '1') as a truck (e.g., label '9') might be benign. However, if a car is misclassified as a bird (e.g., label '2'), the autopilot system might fail to engage the brake as desired and cause serious damage. Thus, identifying critical faults for a critical target class $v_{tgt}$ can be important.

The method 100 of FIG. 1 is used to show the procedure for a version of MDT that targets a class $y_{tgt}$. For target classes, the sampled batch $B_i$ in step 120 should not contain the data point (x; y) with $y = y_{tgt}$. Similar to the untargeted version of MDT, parameter deviations are injected until data points in the batch are all mispredicted as $y_{tgt}$.

In contrast to the untargeted version of MDT, here the change in direction of $\Delta$ is opposite to the gradient at the injection location 1*, step 150 in FIG. 1. If the gradient at 1* is positive, a stuck-off (open) fault is injected; otherwise, a stuck-on (short) fault is injected. In other words, the targeted version of MDT is a gradient-descent algorithm.

Figure 3:
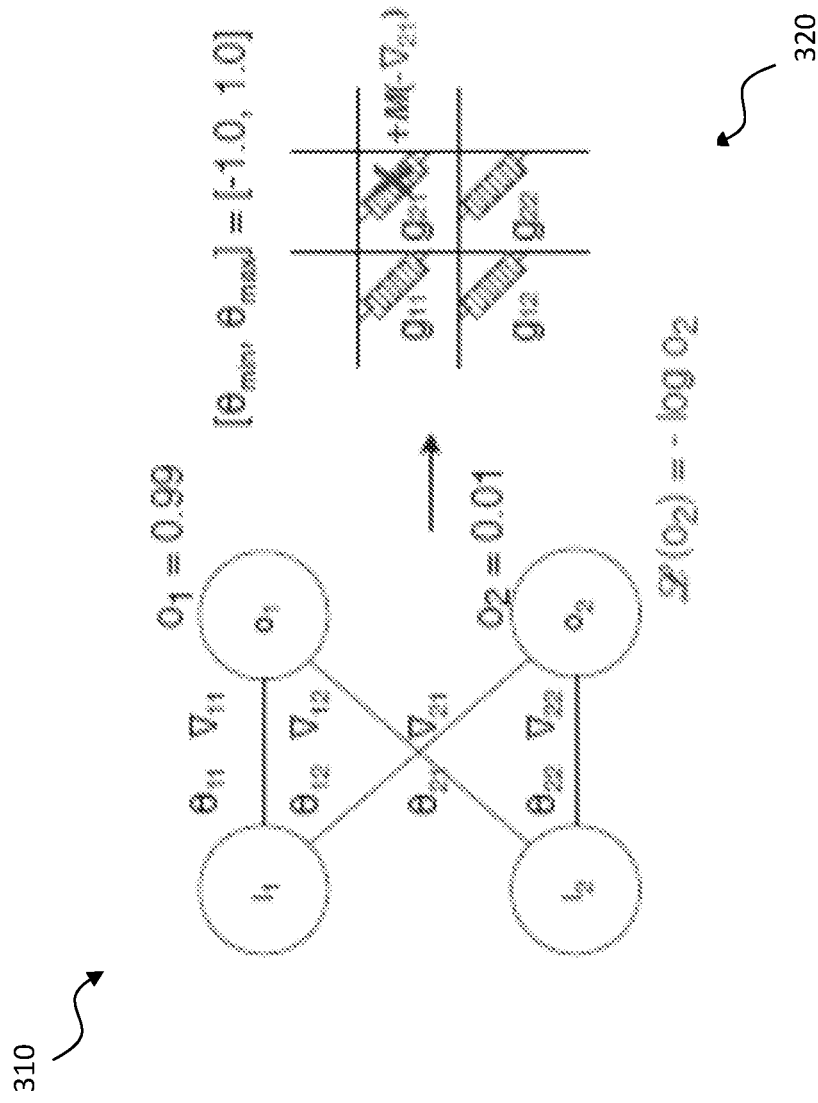
FIG. 3 illustrates a 2×2 fully connected layer of a NN as an example of using at least a portion of the method of FIG. 1 for a targeted classification.

FIG. 3 illustrates a working example of the targeted version of MDT. A 2×2 fully connected layer of a DNN 310 with two input neurons ($i_1$ and $i_2$) and two output neurons ($o_1$ and $o_2$) is used as a classifier. As with FIG. 2, the fully connected layer has four parameters $[\Theta_{11}, \Theta_{12}, \Theta_{21}, \Theta_{22}]=$ [0.15, 0.20, −0.35, −0.25]. For the given input ($i_1; i_1$), the classifier gives the prediction result of label '1' with the confidence $o_1$=0.99. To identify the critical fault that causes the misclassification of label '2', i.e., $o_2$=1.00, the cross-entropy loss for the targeted misclassification is derived, i.e., −log $o_2$=−log 0.01. After the gradient for each parameter is obtained using back propagation $[\nabla_{11}, \nabla_{12}, \nabla_{21}, \nabla_{22}]$=[0.00, 0.00, −1.00, −0.10], $\Theta_{21}$ is identified as the most significant parameter. Deviation is introduced to $\Theta_{21}$ in step 150 in the opposite direction as the obtained gradient and Δ becomes $[0, 0, -\nabla_{21}, 0]$=[0, 0, 1, 00, 0]. Since the deviated parameter $\Theta_{21}+\nabla_{21}$=0.65 is in the nominal range $[\Theta min; \Theta max]$=[−1.0, 1.0], the identified critical fault is a stuck-on fault at the corresponding conductance $g_{21}$ in the crossbar (marked with a cross in FIG. 3). The conductance $g_{21}$ is deviated by a magnitude of $\mathcal{M}(\nabla_{21})=\mathcal{M}(1.00)$ because of the stuck-on critical fault.

Figure 4:
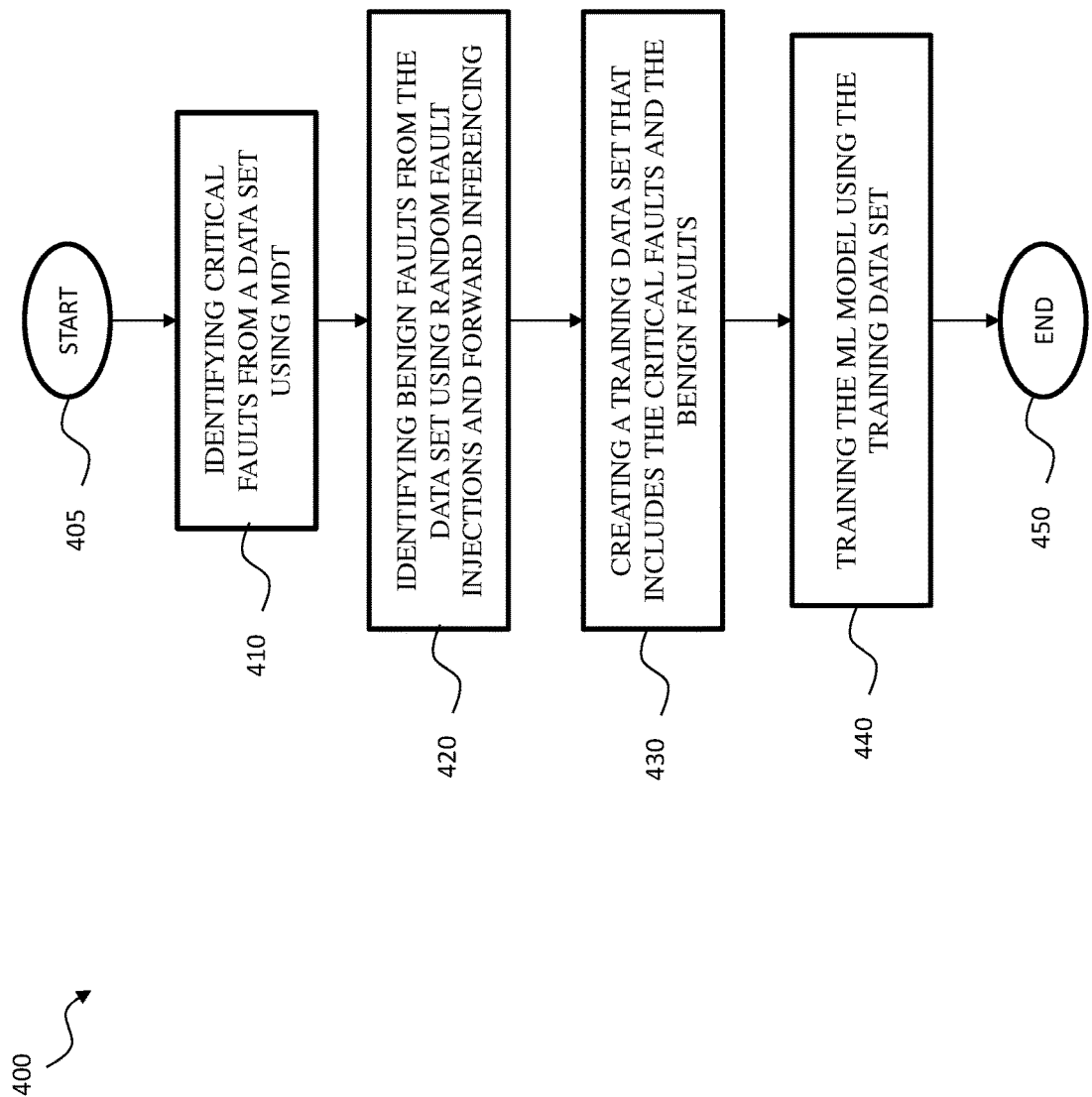
FIG. 4 illustrates a flow diagram of an example of a method of training a machine learning (ML) model for classifying critical faults carried out according to the principles of the disclosure.

FIG. 4 illustrates a flow diagram of an example of a method 400 of training a machine learning (ML) model for classifying critical faults carried out according to the principles of the disclosure. The method 400 can be implemented as a ML-based binary classifier that can predict whether a fault is catastrophic. For the collection of training data, both MDT and a random sampling baseline are employed. A resulting trained ML model, i.e., a critical fault classifier, can be used to quickly predict the functional criticality of a large number of crossbar faults. The method 400 starts in step 405.

In step 410, a sufficient number of critical faults are generated for training using MDT. For example, recorded critical faults similarly obtained from the method 100 can be used. In step 420, a dataset of benign faults is generated using sampling-based fault injection and forward inferencing. In each forward inferencing pass, a crossbar fault is randomly injected and the change in accuracy, i.e., the accuracy drop is observed. For each random fault injection, a fault location and the deviation magnitude is randomly selected. If the inferencing accuracy is lower than a preset threshold $A_{th}$, the fault is labeled as catastrophic otherwise the fault is labeled as benign. The preset threshold $A_{th}$ can be determined based on one or more factors such as the DNN model being used, empirical data, or user preference. The change in the memristor cell conductance follows the constraints imposed by the fault type. For example, to inject a stuck-on/off fault, the deviated parameter should still be in the range $[\Theta min; \Theta max]$. For the stuck-open/short case, the deviated parameter falls out of this range. Typically an overwhelming majority of faults analyzed in this way are benign. Accordingly, step 420 is used to generate training data with respect to benign faults and step 410 using the MDT method is used to generate training data for critical faults.

A particular challenge during training-data collection is to calculate the parameter significance when we analyze faults using fault injection. When MDT is used to generate critical faults, any additional processing is not needed to record the significance for each candidate fault location. On the other hand, it is a challenge to quantify the parameter significance when random fault injection is used. The following strategy can be used. For each random fault injection in a sampling run, a data point is randomly selected from the dataset D to do the backpropagation and thus estimate the significance value. The same dataset D that is used by the MDT to identify critical faults is used here.

In step 430, a training dataset is created that includes both the critical faults and the benign faults. Typically the training dataset includes a balance between the critical faults and the benign faults. For example, an equal number of critical faults and benign faults can be used.

In step 440, an ML model is trained using the training dataset. The following features can be used to train the ML model: 1) fault location, 2) fault type, 3) parameter significance, and 4) deviation amount. The fault location is given by the NN layer of the neuron that is mapped to the corresponding memristor. The significance of the deviated parameter can be used as an important feature for correctly predicting the fault criticality. For MDT, the absolute value of the gradient at the injected fault location, as described in Equation 4, is used as the parameter significance.

The method 400 ends in step 450 with a trained ML model. As an example, the trained ML model can be a neural network with one hidden layer with all layers fully connected and an output non-linear layer that is Softmax. The hidden layer can have 64 neurons. The resulting trained ML model can be used as a critical fault classifier. The trained classifier can achieve high classification accuracy and recall. MDT allows diversifying the extremely unbalanced validation data points (ground truth) generated by the forward inferencing method, where, for example, only 0.04% of the generated faults are typically critical.

Figure 5:
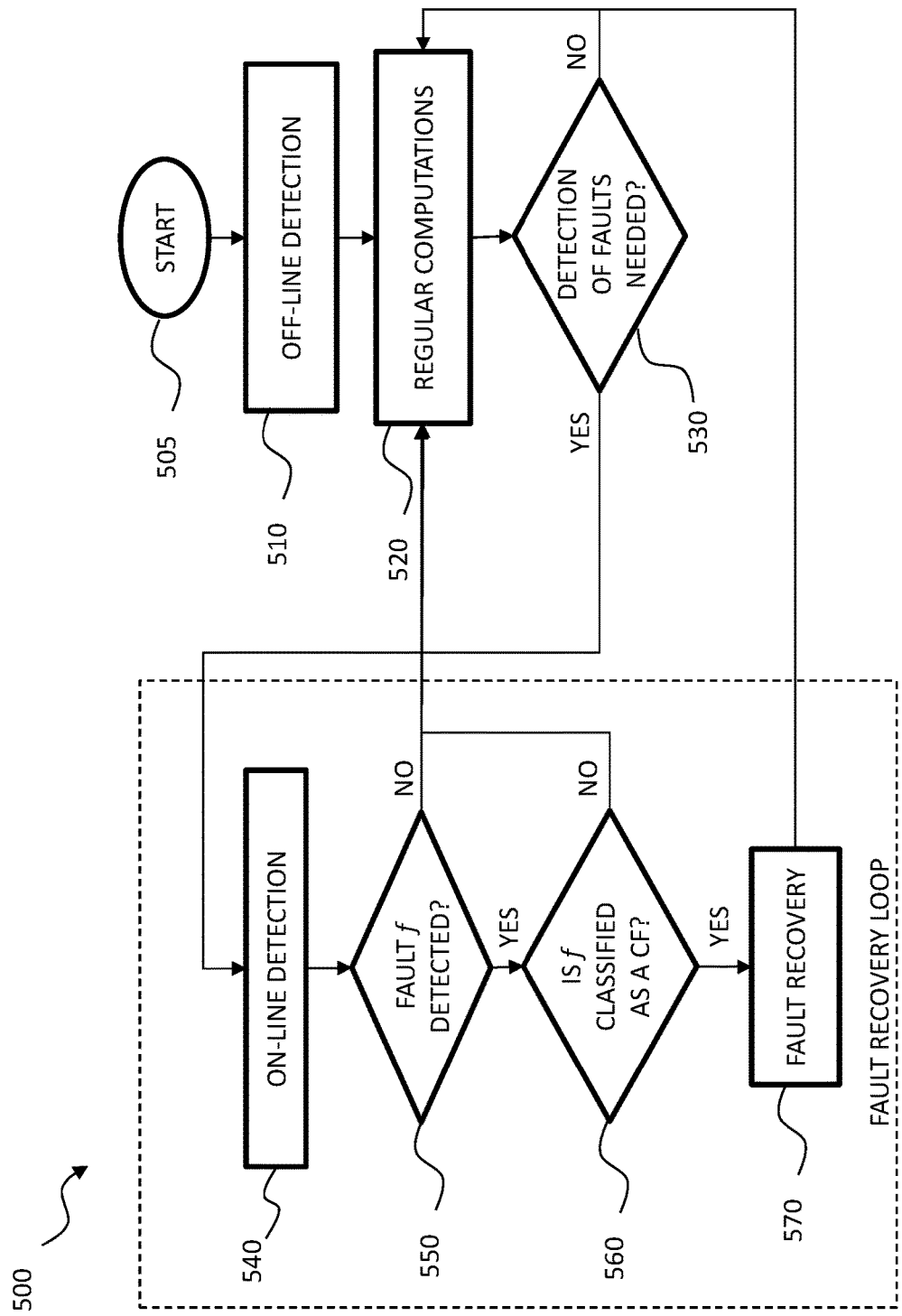
FIG. 5 illustrates a flow diagram of an example of a method of identifying faults in a neural network (NN) carried out according to the principles of the disclosure.

MDT and critical fault classifier trained using MDT can be used to provide a cost-effective fault-tolerant framework for neuromorphic hardware, such as a crossbar-based DNN, both before and after fabrication. FIG. 5 illustrates a flow diagram of an example of a method 500 of identifying faults in a neural network (NN) after fabrication according to the principles of the disclosure. The method 500 begins in step 505 with fabricated crossbar chips and a trained critical fault classifier.

In step 510, off-line detecting of hardware faults of the crossbar chips is performed. The off-line detecting is typically performed at the foundry after fabrication and before shipment. Conventional manufacturing testing, for example, can be used on the crossbar chips to detect manufacturing faults. After the manufacturing testing, the crossbar chips are typically shipped and employed in a processor, such as a GPU, for performing various operations. For example, the crossbar chips can be the hardware for a DNN that classifies images and provides a classifying output.

In step 520, the crossbar chips (or chip) are performing a desired operation, such as classifying images. Accordingly, the crossbar chips are on-line. During the regular computation of the crossbar chips, a determination is made in step 530 if on-line detection of faults is needed. The determination can be periodically determined based on a number of processing cycles, such as after every 100 cycles of classification. The number of processing cycles can vary, also. For example, the number of processing cycles can change based on previous detections of faults and/or critical faults, or a number or type of fault recoveries performed if any. A trigger can also be used to initiate step 530, such as a change or changes in operation parameters of the crossbar chip, or a set number of processing cycles. If the on-line detection of faults is not needed, the method 500 continues to step 520.

When on-line detection of faults is needed, the method 500 continues to step 540 where the detection of faults of the crossbar chips is performed. Throughout the lifetime of the crossbar chips, regular computations and the fault recovery loop that includes steps 540, 550, 560, and 570, can be carried out alternatively. On-line as used herein refers to a solution where fault detection is carried out during normal (functional) operations. Off-line means that functional operation is paused and special-purpose test inputs are applied. Off-line detection can be performed at the foundry (e.g., manufacturing testing) and can also be done during idle periods when no functional operations are carried out. A conventional on-line detection method can be used.

A determination is made in step 550 if a hardware fault of the crossbar chip was detected in step 540. If not, the method 500 continues to step 520. If a fault is detected, a determination is made in step 560 if the fault is a critical fault. A trained critical fault classifier can be used to make the determination. As such, a pre-trained ML model trained via MDT can be used to identify if a fault is a critical fault. If not, the method 500 continues to step 520. When a critical fault is identified, the method continues to step 570 where fault recovery is performed. Conventional fault recovery can be performed, such a remapping and retraining. By only applying fault-recovery procedures when critical faults are detected, the time spent on fault recovery can be reduced and the overall performance can be improved. After performing fault recovery, the method 500 continues to step 520.

Figure 6:
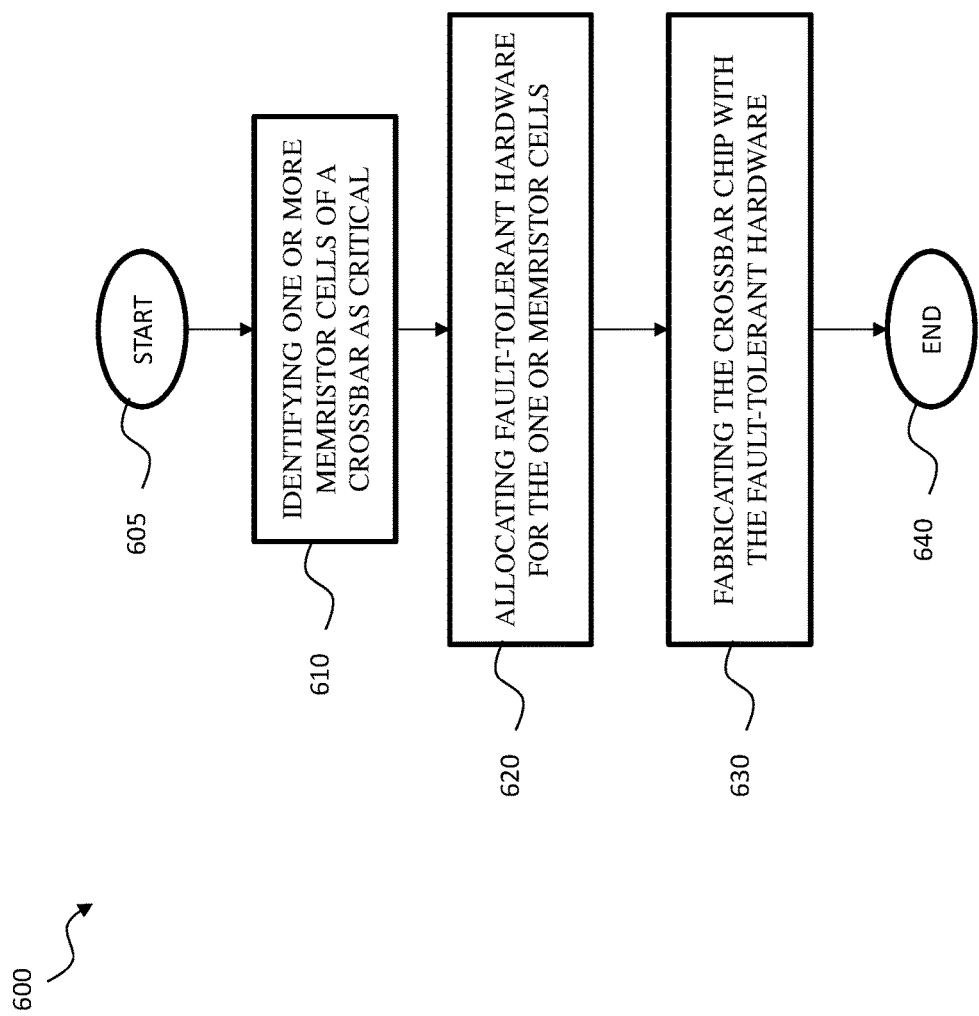
FIG. 6 illustrates a flow diagram of an example of a method of manufacturing a chip including a NN having a memristor crossbar carried out according to the principles of the disclosure.

FIG. 6 illustrates a flow diagram of an example of a method 600 of manufacturing neuromorphic hardware carried out according to the principles of the disclosure. A chip including a NN having a memristor crossbar is used as an example for the neuromorphic hardware and memory cells thereof. During manufacturing of a crossbar-based hardware, fault-tolerant circuits are added to the crossbar to support online fault detection and recovery. For example, spare crossbar columns can be deployed for later remapping use. To reduce the overhead, fault-tolerant hardware can be added based on memristor cells predicted as being critical by a trained critical fault classifier. Critical faults identified by MDT can be used to train the classifier. Though the set of critical memristor cells may vary with different DNN architectures and input data sets, the results obtained using a trained critical fault classifier are highly transferable among similar DNN architectures and image datasets. As such, fault tolerance for the wide variety of DNN applications can be maintained without additional application-specific hardware to tolerate crossbar faults. The method 600 begins in step 605.

In step 610, one or more memristor cells of a crossbar are identified as critical. The results of a critical fault classifier can be used to identify the critical memristor cells. As such, the benefits of MDT can be advantageously used for a similar NN and/or application.

In step 620, fault-tolerant hardware is allocated for the one or more memristor cells that are identified as critical. The fault-tolerant hardware can be at least one spare memristor column corresponding to the one or more memristor cells. One or more rerouting circuits is another example of fault-tolerant hardware that can added at designated locations of the memristor crossbar based on identified critical fault cells.

The crossbar chip with the fault-tolerant hardware is fabricated in step 630. By identifying critical faults, the crossbar chip can be manufactured with a reduced amount of fault-tolerant hardware compared to conventional methods. The method 600 ends in step 640.

Figure 7:
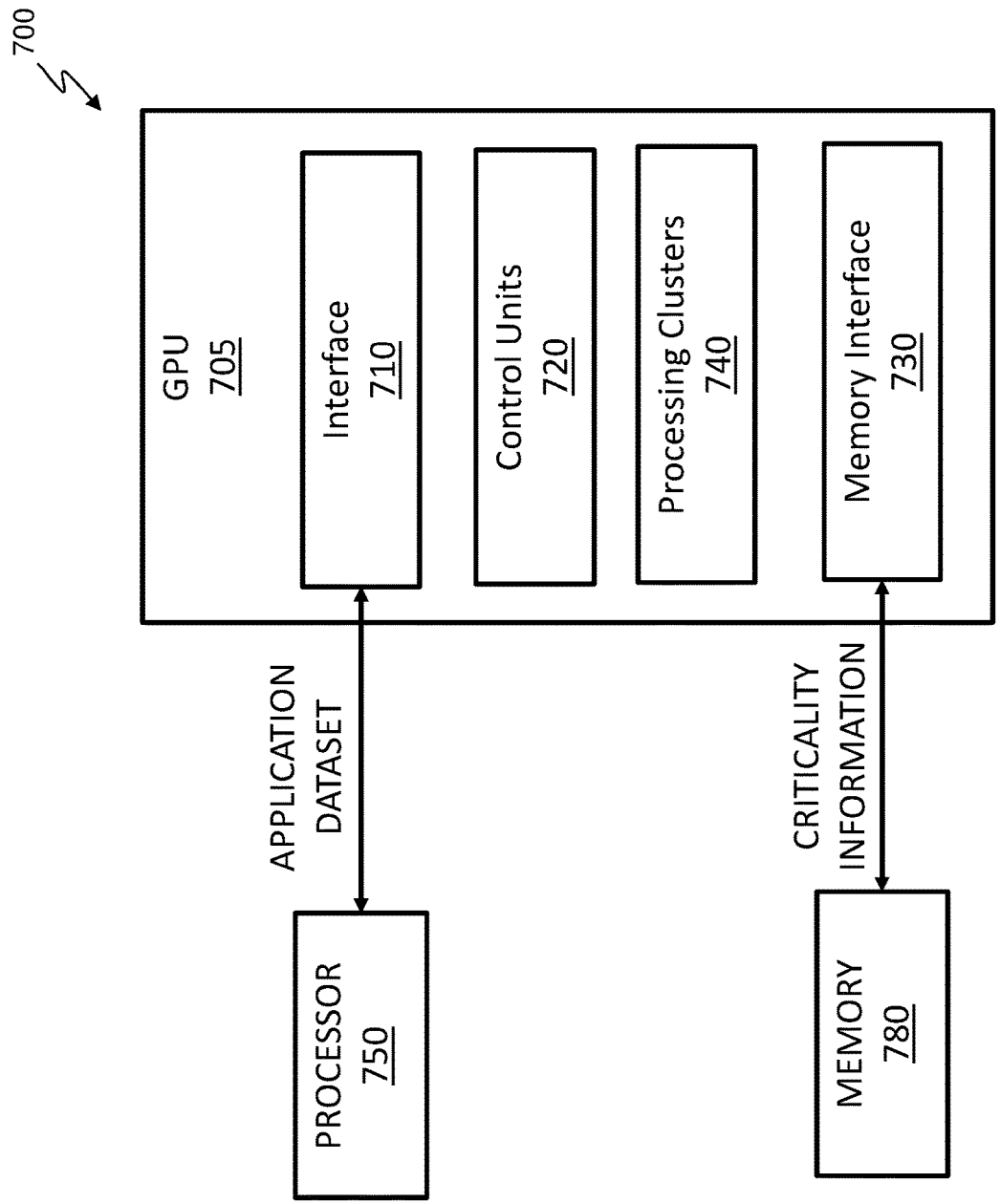
FIG. 7 illustrates a block diagram of an example of a computing system in which at least a portion of the disclosed systems, methods, or apparatuses disclosed herein can be implemented.

At least a portion of methods 100, 400, 500, and 600 can be implemented as a computer program product having a series of operating instructions stored on a non-transitory computer-readable medium that directs a processor when executed thereby to perform operations of the method. The processor can be a CPU or a GPU. Algorithms corresponding to at least a portion of the methods can be stored on a memory and used to direct the operation of a processor. FIG. 7 provides an example of a computing system having a memory and a processor that can be used for at least a portion of the methods 100, 400, 500, and 600 disclosed herein.

FIG. 7 illustrates a block diagram of an example of a computing system 700 in which at least a portion of the disclosed systems, methods, or apparatuses disclosed herein can be implemented. Computing system 700 provides an example of a parallel processing unit, GPU 705, included in a system with one or more other devices. Computing system 700 can be embodied on a single semiconductor substrate and can include other devices such as additional GPUs. GPU 705 can be coupled to the additional GPUs via one or more interconnects, such as high-speed interconnects. GPU 705 can be coupled to processor 750, such as or host processor and a memory 780. The processor 750 can be another GPU or a host processor such as a CPU. The memory 780 can include multiple memory devices. GPU 705 includes an interface 710, control units 720, a memory interface 730, and processing cluster 740. GPU 705 can include additional components that are not illustrated but typically included in a GPU, such as communication busses and interconnects. The computing system 700, or at least a portion of the computing system, can be on a cloud computing platform. For example, the GPU 705, the processor 750, the memory 780, or a combination of two or more can be on a server located in a cloud computing environment, such as in a data center. The data center can be a GPU data center. The computing system 700 can be or can be at least a portion of an AI system, such as an autonomous driving system or a vision system. The computing system 700 can also be a gaming system, such as a cloud-based gaming system. One or more of the GPU 705, the processor 750, and the memory 780 can also be distributed on different computing devices and the computing devices can be distal from one another. For example, the processor 750 and memory 780 can be located on one computing device or system and the GPU 705 can be located on another computing device or system.

Interface 710 is an input and output interface configured to communicate data, commands, and other information, with external components, such as the processor 750. Interface 710 can transmit and receive data and commands over conventional interconnects. The interface 710 can be receive input data, such as an application dataset. Received communications can be sent to the various components of GPU 705, such as control units 720. Control units 720 are configured to manage processing streams, configure processing cluster 740 for processing tasks defined by the streams, distribute the tasks to processing cluster 740, and manage the execution of the tasks on processing cluster 740. The results generated by the tasks can be directed to memory interface 730. Memory interface 730 is configured to store the results in a memory, such as memory 780. For example, at least a portion of a trained critical fault classifier can be stored in the memory 780. In addition to writing to memory 780, memory interface 830 is also configured to read data from memory 780. The memory 780 can also store software or code corresponding to algorithms, such as the MDT algorithm as represented herein. The code can direct operations of the processing cluster 740. The memory 780 can be or include a non-transitory computer readable medium.

Processing cluster 740 includes multiple processing cores for processing the tasks. The processing cores can be optimized for matrix math operations and can be employed for training NNs, such as training a critical fault classifier as disclosed herein. Processing cluster 740 can include a pipeline manager that directs the operation of the processing cores for parallel processing of the tasks. Processing cluster 740 can also include additional components for processing the tasks, such as a memory management unit.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

The processors or computers can be part of GPU racks located in a data center. The GPU racks can be high-density (HD) GPU racks that include high performance GPU compute nodes and storage nodes. The high performance GPU compute nodes can be servers designed for general-purpose computing on graphics processing units (GPGPU) to accelerate deep learning applications. For example, the GPU compute nodes can be servers of the DGX product line from Nvidia Corporation of Santa Clara, California.

The compute density provided by the HD GPU racks is advantageous for AI computing and GPU data centers directed to AI computing. The HD GPU racks can be used with reactive machines, autonomous machines, self-aware machines, and self-learning machines that all require a massive compute intensive server infrastructure. For example, the GPU data centers employing HD GPU racks can provide the storage and networking needed to support large-scale deep neural network (DNN) training, such as for the NNs disclosed herein that are used for classifying critical faults.

The NNs disclosed herein include multiple layers of connected nodes that can be trained with input data to solve complex problems. For example, NN can be trained to identify critical faults. Once the NNs are trained, the NNs can be deployed and used to identify and classify objects or patterns in an inference process through which a NN extracts useful information from a given input.

During training, data flows through the NNs in a forward propagation phase until a prediction is produced that indicates a label corresponding to the input. When the NNs do not correctly label the input, errors between the correct label and the predicted label are analyzed, and the weights are adjusted for features of the layers during a backward propagation phase that correctly labels the inputs in a training dataset. With thousands of processing cores that are optimized for matrix math operations, GPUs such as noted above are capable of delivering the performance required for training NNs for artificial intelligence and machine learning applications.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the Summary may have one or more of the additional features of the dependent claims in combination. It is noted that as used herein and in the appended claims, the singular forms "a", "an", and "the" include plural referents unless the context clearly dictates otherwise.

Those skilled in the art to which this application relates will appreciate that other and further additions, deletions, substitutions and modifications may be made to the described embodiments.

What is claimed is:

1. A method of identifying critical faults in neuromorphic hardware of a neural network, comprising:
  determining a significant parameter of a trained neural network that impacts classification of a sample of a dataset by introducing deviated weights to parameters of the trained neural network;

obtaining a location of the significant parameter in the neuromorphic hardware, wherein the neuromorphic hardware is a crossbar of memristors; and identifying the location as a critical fault of the neuromorphic hardware, wherein the location is a memristor location of the crossbar.

2. The method as recited in claim 1, wherein the determining, the obtaining, and the identifying the location are performed iteratively on other samples of the dataset.

3. The method as recited in claim 2, wherein the method is performed iteratively until all data points of the dataset are impacted.

4. The method as recited in claim 1, wherein the determining further includes deriving a gradient for each of the parameters using backward propagation, determining a significance value of each of the parameters based on the gradient, and identifying a parameter of the parameters having a greatest significance value as the significant parameter.

5. The method as recited in claim 1, further comprising creating a deviated parameter value at the location by combining a gradient for the significant parameter with the value of the significant parameter and inferring a type of fault at the location.

6. The method as recited in claim 5, wherein the combining is a gradient-ascent step wherein a change in direction of deviation is same as the gradient.

7. The method as recited in claim 5, wherein the combining is a gradient-descent when the classification is directed to a targeted class.

8. The method as recited in claim 5, wherein the type of fault is a stuck-on fault when the deviated parameter value is within a nominal value range of elements of the neuromorphic hardware.

9. The method as recited in claim 5, wherein the type of fault is a stuck-open fault when the deviated parameter value is outside of a nominal value range of elements of the neuromorphic hardware.

10. A computer program product comprising a non-transitory computer-readable medium having a series of operating instructions stored thereon that directs a processor when executed thereby to perform operations to execute at least some of the steps of the method of claim 1.

11. A computing system including a processor that performs at least some of the steps of the method of claim 1.

12. A method of training a machine learning (ML) model for classifying critical faults, comprising:
identifying critical faults from a dataset using misclassification-driven training (MDT);
identifying benign faults from the dataset using random fault injections and forward inferencing;
creating a training dataset that includes the critical faults and the benign faults; and
training the ML model using the training dataset.

13. The method of training as recited in claim 12, wherein input features for the critical faults include a fault location, a fault type, a parameter significance value, and a deviated parameter value.

14. The method of training as recited in claim 12, wherein significance of the benign faults are determined by back-propagating a randomly selected data point from an input dataset.

15. The method of training as recited in claim 12, wherein the training of the ML model includes multiple training runs using the training dataset.

16. The method of training as recited in claim 12, wherein the training of the ML model includes verifying the benign faults are not identified as a critical fault by injecting the critical faults into the ML model and evaluating whether they are critical.

17. The method of training as recited in claim 12, wherein the training of the ML model includes verifying the critical faults cause a misclassification.

18. A method of identifying faults in a neural network (NN), comprising:
classifying a dataset using a NN;
determining if detection of faults is needed, wherein the faults are hardware faults of the NN and the NN is a crossbar of memristors fabricated on a chip;
performing detection of the faults when needed; and
performing fault recovery of the hardware faults when a detected fault is a critical fault.

19. The method of identifying faults as recited in claim 18, wherein the determining is periodically based on a number of rounds of the classifying.

20. The method of identifying faults as recited in claim 18, wherein the determining is based on a trigger.

21. The method of identifying faults as recited in claim 18, wherein the fault recovery includes remapping.

22. The method of identifying faults as recited in claim 18, wherein the fault recovery includes retraining.

23. A method of manufacturing a chip including a neural network (NN) having a memristor crossbar, comprising:
identifying one or more memristor cells of a crossbar as critical;
allocating fault-tolerant hardware for the one or more memristor cells that are critical; and
fabricating the chip with the fault-tolerant hardware.

24. The method of manufacturing as recited in claim 23, wherein the fault-tolerant hardware is at least one spare memristor column corresponding to the one or more memristor cells.

25. The method of manufacturing as recited in claim 23, wherein the identifying is based on a classification of critical faults for the neural network and a target application.

26. The method of manufacturing as recited in claim 23, wherein the identifying is based on a classification of critical faults for at least one of another neural network and another target application.

27. A neural network including a chip manufactured according to the method of claim 23.

28. An autonomous driving system including a chip manufactured according to the method of claim 23.

29. A vision system including a chip manufactured according to the method of claim 23.

* * * * *